(12) United States Patent
Lefkowitz

(10) Patent No.: US 6,990,343 B2
(45) Date of Patent: Jan. 24, 2006

(54) CONTEXT BLOCK LEASING FOR FAST HANDOFFS

(75) Inventor: Martin Lefkowitz, Oakland, CA (US)

(73) Assignee: Texas Instruments Incorporated, Dallas, TX (US)

( * ) Notice: Subject to any disclaimer, the term of this patent is extended or adjusted under 35 U.S.C. 154(b) by 509 days.

(21) Appl. No.: 10/230,520

(22) Filed: Aug. 29, 2002

(65) Prior Publication Data

US 2004/0203781 A1 Oct. 14, 2004

Related U.S. Application Data

(60) Provisional application No. 60/364,070, filed on Mar. 14, 2002.

(51) Int. Cl.
*H04Q 7/20* (2006.01)
*H04Q 7/38* (2006.01)

(52) U.S. Cl. ............... 455/436; 455/437; 455/438; 455/443; 455/422.1; 455/426.1; 455/439; 370/331; 370/332; 370/335

(58) Field of Classification Search ........... 455/436, 455/437, 438, 439, 440, 441, 432.1, 432.2, 455/432.3, 410, 411, 403, 445, 500, 517, 455/550.1, 453, 426.1, 426.2, 434, 442; 370/331, 370/332, 335
See application file for complete search history.

(56) References Cited

U.S. PATENT DOCUMENTS

| | | | |
|---|---|---|---|
| 6,757,520 B2 * | 6/2004 | Attar et al. | 455/63.1 |
| 2002/0085719 A1 * | 7/2002 | Crosbie | 380/248 |
| 2002/0174335 A1 * | 11/2002 | Zhang et al. | 713/168 |

* cited by examiner

*Primary Examiner*—Keith Ferguson
(74) *Attorney, Agent, or Firm*—Abdul Zindani; W. James Brady, III; Frederick J. Telecky, Jr.

(57) ABSTRACT

The roaming of a wireless device 115 extends the effective range of a wireless network 100 by passing a device 115 between access points as the device leaves the coverage area of one and enters another. Roaming can be slow and problematic if an old link is disconnected prior to establishing a new link, especially if authentication and security is required. The present invention speeds up roaming by using existing mechanisms to initiate a new link with a new access point 120 prior to disconnecting the old link with an old access point 110.

24 Claims, 3 Drawing Sheets

CONTEXT BLOCK LEASING FOR FAST HANDOFFS

This application claims priority to provisional application Ser. No. 60/364,070, filed Mar. 14, 2002, entitled "Context Block Leasing". This provisional application is assigned to the assignee of this application and is also incorporated herein by reference.

FIELD OF THE INVENTION

This invention relates generally to wireless communications networks and particularly to performing fast handoffs for a roaming communications device.

BACKGROUND OF THE INVENTION

With recent development of relatively high-speed wireless communications networks, wireless connectivity has become one of the fastest growing methods for implementing communications networks. Wireless networks provide fast deployment due to their elimination of the need to create a wired network infrastructure and freedom of movement since the wireless communications devices are not tied down to a specific location by the network cable. The inherently more expensive equipment (transmitters and receivers) is often more than offset by the rapid deployment and freedom of movement that they provide.

However, the freedom of movement in wireless communications devices is limited by the transmitters (and the transmit power) at both the wireless communications device and the wireless network infrastructure. The amount of transmit power is regulated by the government to minimize the impact of these wireless communications networks on other electronic devices and networks. The transmit power is further constrained by heat dissipation and battery life concerns. Additionally, physical constraints such as maximum propagation delay and latency also place a limit on how far a wireless communications device can travel from its wireless network before the wireless network stops working.

One way to increase the effective operating range of a wireless communications network is to have multiple transmitters and receivers with enhanced capabilities (transceivers) in the wireless network infrastructure. These transceivers have enhanced capabilities to allow them to control the communications and operations of the wireless communications devices. In some wireless networks, these transceivers are often called wireless access points. With multiple wireless access points, a wireless communications device can switch from one wireless access point to another whenever the wireless communications device moves outside of a coverage area covered by one wireless access point into a coverage area provided by a different wireless access point. The process of moving from the control of one wireless access point to another is known as roaming, with the exchange between one wireless access point to another being known as a handoff.

Roaming permits the enlargement of the coverage area of a wireless communications network through the use of multiple wireless access points without needing to increase the transmit power of the wireless devices and while remaining under the restraints set forth by governmental regulations and the laws of physics.

In wireless communications networks adherent to the Institute of Electrical and Electronics Engineers 802.11 Wireless Local Area Network technical standard (commonly referred to as IEEE 802.11 WLAN networks), when a wireless communications device leaves the coverage area of a first wireless access point, it stops communications with the first wireless access point and attempts to initiate communications with a second wireless access point. This process is known as disassociating and reassociating, wherein the wireless communications device disassociates with the first wireless access point and reassociates with the second wireless access point. Unfortunately, the disassociating and reassociating process can take an extended amount of time, especially with the need to re-authenticate the wireless communications device with the second wireless access point. Re-authentication is needed because a wireless communications device cannot simply be added to the network, since doing so could compromise the security of the network. During this extended period of time, the wireless communications device cannot communicate with any device other than the second wireless access point. Additionally, should the reassociating fail, the wireless communications device may not be able to communicate for an extended amount of time while it attempts to establish a communications link with a different wireless access point.

A need has therefore arisen for a faster and more efficient roaming handoff procedure that does not require that the wireless communications device disconnecting with one wireless access point until it is sure that it can reconnected with another.

SUMMARY OF THE INVENTION

In one aspect, the present invention provides a fast handoff method comprising the steps of receiving an authentication message, scanning for an alternate wireless access point (WAP), if the alternate WAP was found, then sending a message to a current WAP, receiving a response message from the current WAP, if the response message is an affirmative, then disassociating with the current WAP, and reassociating with the alternate WAP.

In another aspect, the present invention provides A method for reducing authentication latency comprising the steps of:

at a first wireless access point (WAP): transmitting an authentication message to a wireless communications device (WCD), forwarding a context lease request to an alternate WAP, returning a context lease response to the WCD;

at the WCD: receiving an authentication message, scanning for an alternate wireless access point (WAP), if the alternate WAP was found, then sending a message to a current WAP, receiving a response message from the current WAP, if the response message is an affirmative, disassociating with the current WAP, reassociating with the alternate WAP;

at the alternate WAP: receiving the context lease request from the first WAP, authenticating the WCD, returning an affirmative response message if authentication succeeds, else return a negative response message, and reassociating with the WCD if authentication succeeds.

The present invention provides a number of advantages. For example, use of a preferred embodiment of the present invention permits a wireless communications device to establish that it establish a communications link with a second wireless access point prior to disconnecting an existing communications link with a first wireless access point. This results in less interruption of any communications being performed by the wireless communications device, improving the overall performance of the device.

Also, use of the present invention shortens the time duration required to disconnect an existing communications link and establish a new communications link by attempting establish the new communications link prior to disconnecting the existing communications link. The overlap reduces latency and increases efficiency of the process.

Additionally, use of the present invention allows for faster establishment of a new secured communications link through the use of an existing communications link with a trusted wireless access point as an intermediary. The use of a trusted wireless access point can eliminate some of the security checking required to establish a secured communications link.

Also, use of the present invention does not require the addition of any new hardware or communications protocols to support the fast handoff. This permits the implementation of the present invention on existing hardware without modification.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts, which can be embodied in a wide variety of specific contexts. The specific embodiments discussed are merely illustrative of specific ways to make and use the invention, and do not limit the scope of the invention.

The discussion of a preferred embodiment of the present invention presented below will focus principally on a wireless communications network that is adherent to The Institute of Electrical and Electronics Engineers (IEEE) technical standard 802.11, commonly referred to as IEEE 802.11. The IEEE 802.11 technical standard is specified in a technical document entitled "ISO/IEC 8802-11, ANSI/IEEE Std. 802.11 First Edition 1999-00-00 Information Technology—Telecommunications and Information Exchange Between Systems—Local and Metropolitan Area Networks—Specific Requirements—Part 11: Wireless LAN Medium Access Control (MAC) and Physical Layer (PHY) Specifications," published 1999. The technical standard is incorporated herein by reference.

Two supplements have been published to further enhance the IEEE 802.11-1999 document. The first entitled "IEEE Std 802.11b-1999, Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Higher-Speed Physical Layer Extension in the 2.4 GHz Band," published January 2000, and the second entitled "IEEE Std 802.11a-1999, Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Higher-Speed Physical Layer Extension in the 5 GHz Band," published December 1999, are also incorporated herein by reference.

Although the discussion is focused on IEEE 802.11 wireless LANs, it should not be construed that the present invention is limited in applicability to only these types of wireless LANs. The present invention is applicable to other wireless communications networks where a wireless communications device communicates to others via a wireless access point. Examples of such wireless communications networks include Bluetooth networks, Hiperlan II networks, and other proprietary wireless networks. The present invention has applicability to even cellular communications networks where a cellular telephone or communications device roams between various cell stations.

Figure 1:
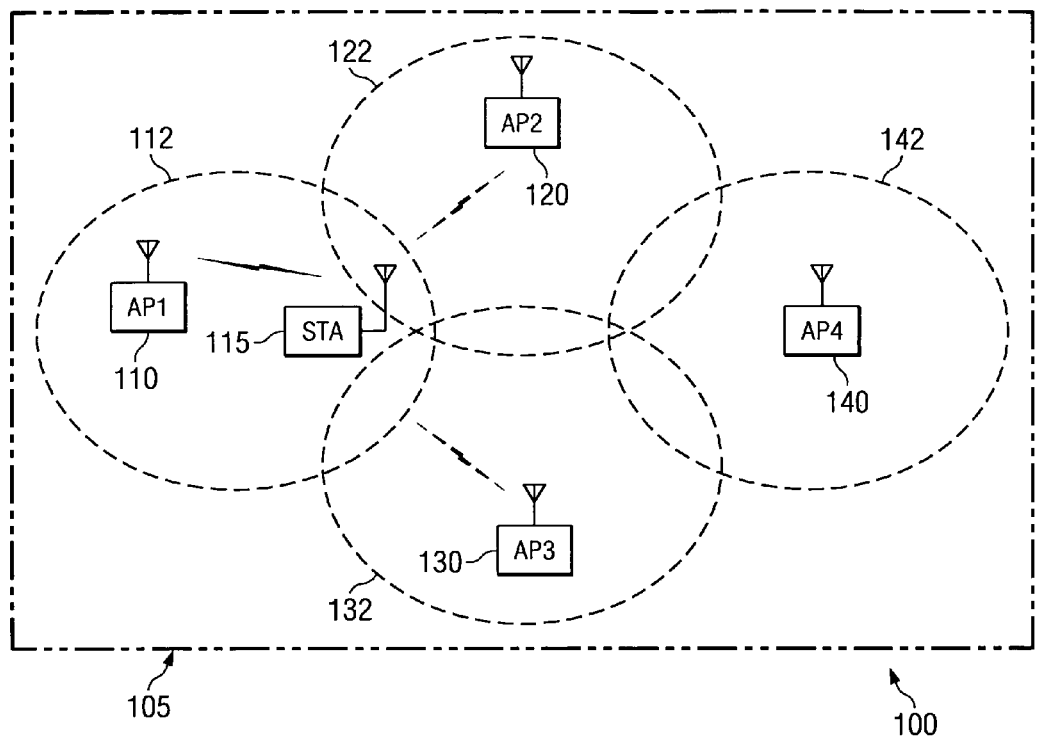
FIG. 1 illustrates a wireless communications network made up of a plurality of wireless access points, each with its own effective coverage area, combining to form a larger wireless communications network than possible with a single wireless access point.

Referring now to FIG. 1, the diagram illustrates a wireless communications network 100 with an infrastructure made up of several wireless access points (WAP). The wireless communications network 100 is made up of several wireless access points, along with other required network infrastructure devices that are not displayed in FIG. 1. Each WAP, for example, WAP 110, has an effective coverage range that is determined by the power of the WAP's transmitter and its operating environment. For example, in a relatively noise free environment with minimal signal reflectors and obstructions, it is possible for a WAP with a lower powered transmitter to have a larger effective coverage range than a different WAP with a higher powered transmitter that is operating in a noisier environment with a lot of signal reflectors and other obstructions. For example, the WAP 110's effective coverage area is displayed as a dashed circle 112, although it is highly unlikely that its actual effective coverage area would be in the shape of a circle.

If there were a single WAP in a wireless communications network, then the wireless communications network's extended service set (ESS) would be equal to the effective coverage area of the single WAP. However, in many wireless communications networks, there are multiple WAPs and other wired and wireless network devices, in these cases, these networks' ESS would be a union of all of the devices effective coverage areas. FIG. 1 displays an ESS 105 that envelopes the effective coverage areas of all the WAPs in the wireless communications network 100 plus those of other devices that are not displayed in FIG. 1.

Operating inside the effective coverage area 112 of the WAP 110 is a wireless communications device 115. Wireless communications devices are commonly referred to as stations or STA for short. While the STA 115 is within the effective coverage area 112 of the WAP 110, communications to and from the STA 115 are made typically through the WAP 110. Since the STA 115 is a wireless device, it is most likely mobile. As the STA 115 moves around, it can move out of the effective coverage area 112 of the WAP 110. As the STA 115 begins to move out of the effective coverage area 112 of the WAP 110, the STA 115 (and the WAP 110) may begin to notice an increase in error rates, such as bit-error rates or frame-error rates. When the error rate reaches a certain prespecified threshold, the WAP 110 may be configured to send a message to the STA 115 to let it know of the deteriorating conditions. The message from the WAP 110 may initiate a handoff. Alternatively, when the error rate reaches a certain prespecified threshold, the STA 115 realizes that it is coming to the outer fringes of the effective coverage area 112 of the WAP 110 and must prepare itself to change to a different WAP (if one exists).

The ESS 105 of the wireless communications network 100 contains at least three other WAPs 120, 130, and 140 with their own corresponding effective coverage areas 122, 132, and 142. If, in its movements, the STA 115 moves into the effective coverage areas of one of these WAPs, it is possible for the STA 115 to drop its communications link with the WAP 110 and initiate a new communications link with another WAP whose effective coverage area it just entered. The process of dropping a communications link with a first WAP and establishing a new communications link with a second WAP is commonly referred to as a handoff.

Figure 2:
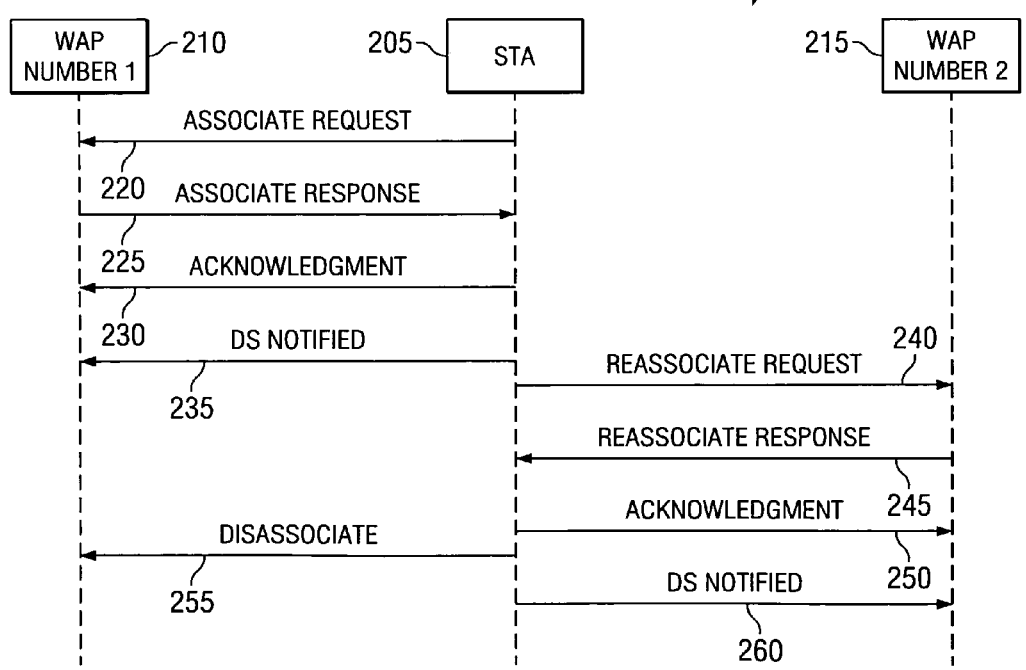
FIG. 2 illustrates a prior art fast handoff procedure between a wireless communications device and two wireless access points.

Referring now to FIG. 2, the diagram illustrates a detailed view of a prior art handoff procedure between a wireless communications device and two wireless access points. The diagram in FIG. 2 displays a wireless communications device (STA) 205, a first wireless access point (WAP#1) 210, and a second wireless access point (WAP#2) 215. Various transmissions between the STA 205 and the WAPs 210 and 215 are displayed, with time increasing going down the diagram.

As discussed earlier, when the WAP#1 210 notices that the STA 205 is starting to approach the outer limits of its effective coverage area, most likely through detection of a lower signal level or increased error rates, the WAP#1 210 transmits a message to the STA 205 to let it know that it is starting to move out of the effective coverage area of the WAP#1 210 and that it should start to look for an alternate wireless access point. Alternatively, when a wireless communications device notices that it is starting to approach the outer limits of the effective coverage area of a wireless access point to which it is linked, the wireless communications device knows that it must find a new wireless access point. The process of disconnecting with the previous WAP and connecting with a new WAP is known as a handoff.

To begin a handoff, the STA 205 must initiate the termination of its existing communications link with the first WAP (WAP#1) 210. This is accomplished with the STA 205 transmitting an "ASSOCIATE-REQUEST" packet 220 to WAP#1. The "ASSOCIATE-REQUEST" packet 220 has an effect of requesting WAP#1 210 to maintain a context (or description) of the STA 205. The context may contain network addresses and other network configuration information about the STA 205, information that is critical in getting packets to and from the STA 205. The WAP#1 210 responds by sending an "ASSOCIATE-RESPONSE" packet 225 to the STA 205. The "ASSOCIATE-RESPONSE" packet 225 provides information on how it responded to the "ASSOCATE-REQUEST" packet 220. The WAP#1 210 has the option of responding positively (saving the context information for the STA 205) or negatively (refusing to save the context information for the STA 205). Although the WAP#1 may choose to not save the context information for the STA 205, it is highly unusual for it to choose to not do so.

After receiving the "ASSOCIATE-RESPONSE" packet 225 from the WAP#1, the STA 205 responds by sending an "ACKNOWLEDGMENT" packet 230 to the WAP#1. The "ACKNOWLEDGMENT" packet 230 is a simple acknowledgment of the receipt of the "ASSOCIATE-RESPONSE" packet 225. With the reception of the "ACKNOWLEDGMENT" packet 230, the WAP#1 notifies a distribution system (DS) of the impending movement of the STA 205 to a different WAP through a packet 235. The DS is a system used to interconnect various basic service sets and local area networks into an ESS. The net effect of notifying the DS is that it will expect another notification from a different WAP of new context information for the STA 205. This new context information will be used to route packets to and from the STA 205. The information contained within the new context information will supercede any prior information for the STA 205.

After the STA 205 transmits the "ACKNOWLEDGMENT" packet 230 to the WAP#1, it begins to look for a new WAP. The STA 205 may perform a scan for signals from other WAPs of sufficient strength, with the STA 205 normally choosing the WAP with the greatest signal strength, for example, WAP#2 215. After finding the WAP#2 215, the STA 205 transmits a "REASSOCIATE-REQUEST" packet 240 to the WAP#2 215. The "REASSOCIATE-REQUEST" packet 240 is a packet specifically addressed to WAP#2 215 that effectively requests that WAP#2 215 allow the STA 205 to establish a communications link with it and that WAP#2 215 will distribute context information to the DS for the STA 205. The WAP#2 215 responds with a "REASSOCIATE-RESPONSE" packet 245 that provides an answer to the "REASSOCIATE-REQUEST" packet 240. The WAP#2 215 may allow the reassociate request or it may disallow the reassociate request from the STA 205. Upon receipt of the "REASSOCIATE-RESPONSE" packet 245 from the WAP#2 215, the STA 205 returns an "ACKNOWLEDGMENT" packet 250. At the same time that it transmits the "ACKNOWLEDGMENT" packet 250, the STA 205 transmits a "DISASSOCIATE" packet 255 to the WAP#1 210. The "DISASSOCIATE" packet 255 completely severs any remaining connection the STA 205 had remaining with the WAP#1 210. If the WAP#2 215 had allowed the STA 205 to establish a communications link with it, then the WAP#2 215 would then notify the DS of the new context information for STA 205. After notifying the DS, the STA 205 returns to its pre-handoff operations.

Although not shown in FIG. 2, there is may be a large amount of additional information being transferred between the STA 205 and WAP#1 210 and WAP#2 215. This information may include authentication information and other security information. For example, as a result of the "ASSOCIATE-REQUEST" packet 220, the STA 205 is no longer a "verified" or "trusted" member of the wireless communications network. Therefore, when it attempts to reassociate with WAP#2 215, an authentication and verification process takes place. If the authentication and verification process fails, then STA 205 will not be permitted to establish a communications link with the WAP#2 215. The authentication and verification process may consume an extended period of time, especially if there is a large amount of other network traffic and/or noise. During this time, packets destined for the STA 205 or originating from the STA 215 are not (cannot be) delivered and are typically queued for delivery. Should a transmission occur during the association/reassociation process, it is likely to be lost and would depend on recovery/retransmission algorithms to achieve successful delivery.

The handoff procedure displayed in FIG. 2 requires that the STA 205 essentially disconnect with WAP#1 210 prior to establishing a communications link with WAP#2 215. The "ASSOCIATE" sequence of messages 220, 225 and 230 tells WAP#1 210 that the STA 205 is going to break the existing link and the distribution system is notified to this effect by the WAP#1 210 (DS NOTIFIED 235) prior to the STA 205 even initiating any communications with STA#2 215.

Figure 3:
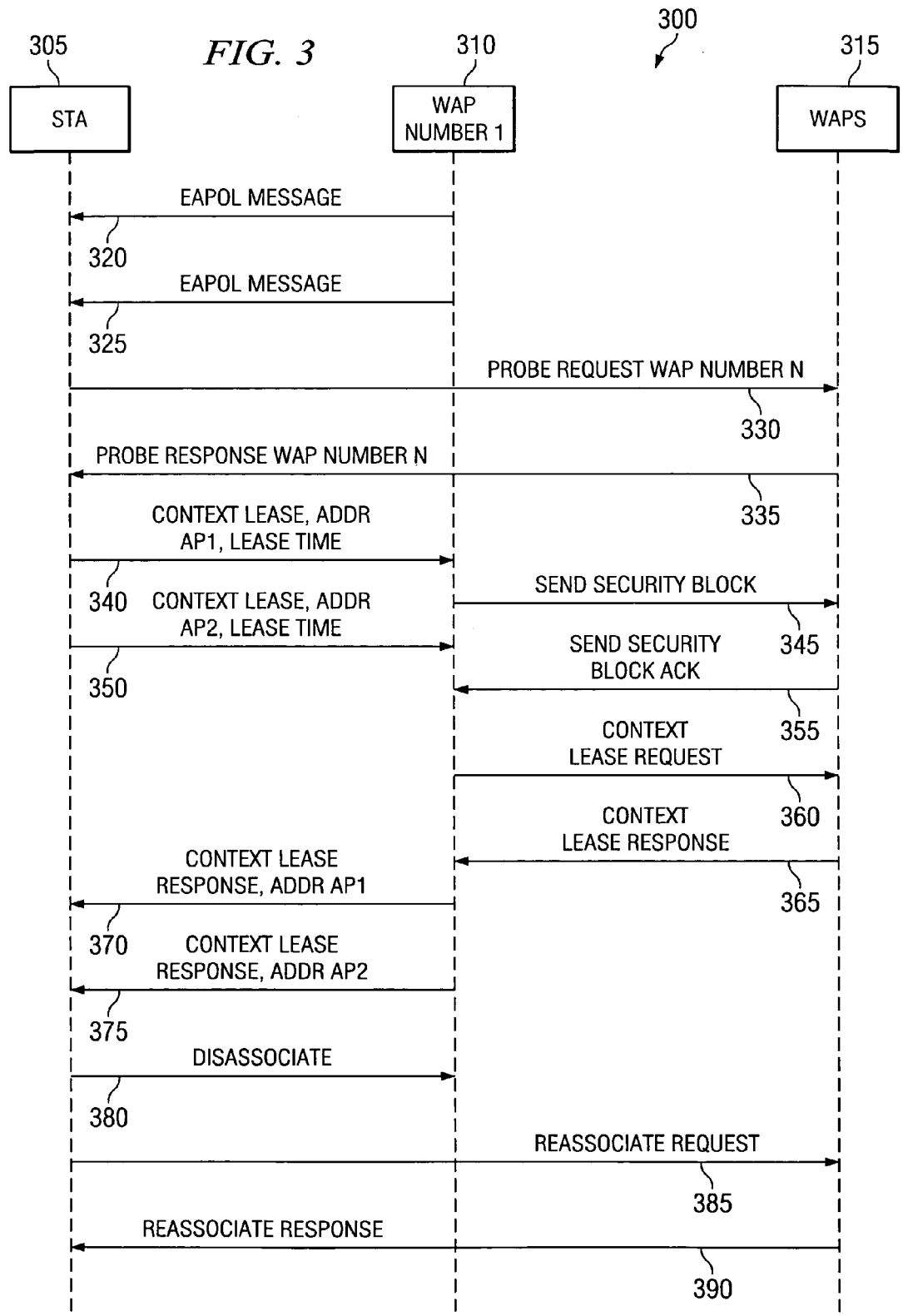
FIG. 3 illustrates a preferred embodiment of a fast handoff procedure between a wireless communications device and a plurality of wireless access points using context block leasing according to a preferred embodiment of the present invention.

Referring now to FIG. 3, the diagram illustrates a detailed view of a handoff procedure using context block leasing to improve performance according to a preferred embodiment of the present invention. The handoff procedure involves at least three devices, a wireless communications device (STA) 305, a wireless access point to which the STA 305 has an established communications link (WAP#1) 310, and one or more other wireless access points operating in the same general vicinity as WAP#1 and have effective coverage areas that slightly overlap WAP#1's (WAPS) 315. In general, the WAPS 315 are the wireless access points that the STA 305 can detect as it scans for other wireless access points. According to a preferred embodiment of the present invention, the WAPS 315 are part of the same distribution system as the WAP#1 310.

According to a preferred embodiment of the present invention, the present invention makes use of a context block to transfer crucial authentication information from a first wireless access point to a second wireless access point. The first wireless access point would be the wireless access point would be the one with which the wireless communications device has an established communications link with and the second wireless access point would be the wireless access point with whom the wireless communications device wishes to establish a communications link with. Ordinarily, the context block is a block of data used in the wireless communications network to transfer important network data about the wireless communications device from one wireless access point to another. Examples of the data contained in the context block would be the device's network address, network name, and other vital information required to route messages to and from the device.

According to a preferred embodiment of the present invention, the WAP#1 310 initiates the fast handoff procedure when it notices the occurrence of one or more events, such as: the detection of a reduction in signal power of incoming transmissions from the STA 305, an increase in the number of errors in the incoming transmissions (the errors may be measured in bit-error-rate, frame-error-rate, packet-error-rate, etc.), the absence of expected acknowledgments or replies, the timing-out of certain events. The occurrence of one or more of the above listed events may be an indicator of the STA 305 is approaching the edge of the effective coverage area of the WAP#1 310. If the STA 305 does nothing and continues to move away from the WAP#1 310, its communications link with the WAP#1 310 will be lost when it leaves the effective coverage area of the WAP#1 310.

As described earlier (FIG. 2), it has been standard practice for the STA 205 to break the existing communications link prior to establishing a new communications link. However, doing so can lead to extended periods of time when the STA 205 is not able to send or receive data.

According to a preferred embodiment of the present invention, when the WAP#1 310 begins to notice the occurrence of one or more of the events that indicate that the STA 305 is approaching the limit of the effective coverage area of the WAP#1 310, the WAP#1 310 initiates a fast handoff procedure. The WAP#1 310 begins by transmitting a first "EAPOL MESSAGE" 320 to the STA 305. An "EAPOL MESSAGE" is an Extensible Authentication Protocol over LANs message and is used to transmit encryption keys, etc. for authentication purposes. Examples of keys transmitted via an "EAPOL MESSAGE" may include a Dyad Master Key (DMK), Assemblage Master Key (AMK), Session Key, and Group Key. These keys are used to authenticate a client, such as the STA 305. According to a preferred embodiment of the present invention, the first "EAPOL MESSAGE" 320 contains a session key and a group key.

Following the first "EAPOL MESSAGE" 320, the WAP#1 310 transmits a second "EAPOL MESSAGE" 325 to the STA 305. According to a preferred embodiment of the present invention, the second "EAPOL MESSAGE" 325 carries with it a transmit session key. The transmit session key permits the STA 305 to transmit messages of its own (to other wireless access points) as an authenticated device. After receiving the second "EAPOL MESSAGE" 325 and the transmit session key, the STA 305 transmits a "PROBE REQUEST" message 330 to one or more wireless access points in WAPS 315. The "PROBE REQUEST" message 330 is essentially a request from the STA 305 to the addressed wireless access point to serve as the access point for the STA 305.

According to a preferred embodiment of the present invention, the STA 305 may transmit multiple "PROBE REQUEST" messages 330 to as many different wireless access points as it is able to detect. Alternatively, the STA 305 may transmit "PROBE REQUEST" messages 330 to only the wireless access points with signal levels higher than a certain specified level. The STA 305 may also be configured to transmit "PROBE REQUEST" messages 330 to only the top two or three wireless access points with the most powerful signal levels. Ideally, the STA 305 does not transmit a "PROBE REQUEST" message to WAP#1 310.

After transmitting the "PROBE REQUEST" messages 330, the STA 305 waits for a response. While it is waiting, the STA 305 may continue normal operations with the WAP#1 310. One (or more) of the wireless access points that the STA 305 transmitted a "PROBE REQUEST" message 330 to, replies and transmits a "PROBE RESPONSE" message 335 to the STA 305. The "PROBE RESPONSE" message 335 will notify the STA 305 whether or not the sender is agreeable to becoming the access point for the STA 305. For illustrative purposes, assume that the "PROBE RESPONSE" message 335 was an affirmative response from an n-th wireless access point (WAPN) (not shown).

After receiving an affirmative response from a wireless access point in the form of the "PROBE RESPONSE" message 335, the STA 305 transmits a "CONTEXT LEASE" message 340 to WAP#1 310. The "CONTEXT LEASE" message 340 may contain information such as the media access control (MAC) address of the WAPN, the duration of the context block lease, etc. Upon receipt of the "CONTEXT LEASE" message 340, the WAP#1 310 transmits a request to transmit a security block to WAPN in the form of a "SEND SECURITY BLOCK" message 345. The WAPN responds with a "SEND SECURITY BLOCK ACKNOWLEDGEMENT" message 350. The "SEND SECURITY BLOCK ACKNOWLEDGEMENT" message 350 is an acknowledgment of the receipt of the "SEND SECURITY BLOCK" message 345.

If more than one wireless access point had responded to the "PROBE REQUEST" message 330 transmitted by the STA 305, then the STA 305 can transmit more than one "CONTEXT LEASE" message, for example, the STA 305 may transmit a second "CONTEXT LEASE" message 350 to a second wireless access point which had responded to it's "PROBE REQUEST" message.

When the WAP#1 310 receives the "SEND SECURITY BLOCK ACKNOWLEDGEMENT" message 350 from the WAPN, the WAP#1 310 transmits a "CONTEXT LEASE REQUEST" message 360 to the WAPN. In the "CONTEXT LEASE REQUEST" message 360, there is security information, such as a session key and a transmit session key, along with addresses of the STA 305, WAP#1, and the duration of the context block lease. As discussed previously, the context block normally does not contain information such as the session key and the transmit session key. According to a preferred embodiment of the present invention, the "CONTEXT LEASE REQUEST" message 360 contains the necessary information for the WAPN to authenticate the STA 305. After receiving the "CONTEXT LEASE REQUEST" message 360, the WAPN authenticates the STA 305. Depending upon the results of the authentication, the WAPN can decide to become the access point for the STA 305 or not.

After authenticating the STA 305, the WAPN transmits a "CONTEXT LEASE RESPONSE" message 365 to the WAP#1 310. The "CONTEXT LEASE RESPONSE" message 365 contains either an affirmative or a negative response to the "CONTEXT LEASE REQUEST" message 360, but is used as a confirmation to whether or not the WAPN has been able to authenticate the STA 305. If the STA 305 has been authenticated, then the WAPN can become the access point for the STA 305. If not, then the STA 305 will need to find an alternative wireless access point.

The WAP#1 310 provides to the STA 305 the results of the context lease requests ("CONTEXT LEASE" messages 340 and 350) with "CONTEXT LEASE RESPONSE" messages 370 and 375. Depending on how many affirmatives the STA 305 receives, the STA 305 may be able to make a choice as to which wireless access point it wants to become its new access point. For example, the STA 305 measure the signal power level of the wireless access points and chose the wireless access point with the strongest signal power. Once the STA 305 has chosen the wireless access point (or if only one responded positively), the STA 305 sends a "DISASSOCIATE" message 380 to the WAP#1 310. As discussed previously, the "DISASSOCIATE" message 380 severs the communications link between the STA 305 and the WAP#1. Although not shown, after the WAP#1 310 and the STA 305 breaks their communications link, the WAP#1 310 notifies the distribution system of the break in a manner similar to that displayed in FIG. 2.

After disassociating with the WAP#1 310, the STA 305 reassociates with the WAPN via a "REASSOCIATE REQUEST" message 385. Since all the authentication steps have already been preformed, the WAPN immediately responds with a "REASSOCIATE RESPONSE" message 390 and the communications link between the STA 305 and WAPN is established and WAPN becomes the access point for the STA 305. Again not shown, but WAPN notifies the distribution system of the changes regarding the STA 305.

As discussed previously, the STA 305 can continue to perform its normal tasks while awaiting its authentication by the various wireless access points. Rather than forcing the STA 305 to wait while the authentication takes place, this overlap permits the authentication to proceed at the same time that the STA 305 is still performing useful work. Additionally, the authentication request is introduced by a trusted entity (WAP#1 310), which will allow the authentication to proceed more smoothly.

Figure 4:
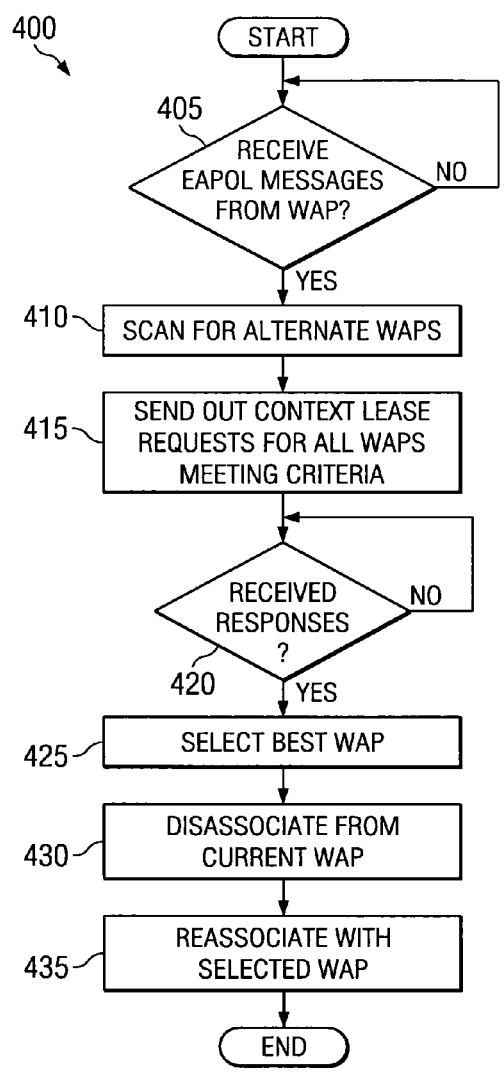
FIG. 4 illustrates an algorithm to implement a fast handoff procedure executing on a wireless communications device according to a preferred embodiment of the present invention.

Referring now to FIG. 4, the flow diagram illustrates an algorithm 400 used to perform the fast handoff according to a preferred embodiment of the present invention. According to a preferred embodiment of the present invention, the algorithm 400 executes on a processing element located in a wireless communications device that is part of a wireless communications network. The algorithm 400 is continually running in the wireless communications device.

Since the algorithm 400 is constantly running, it sits and waits for the arrival of specific EAPOL messages from the access point with which the wireless communications device is in direct contact (current access point) (block 405). Until such messages arrive, the algorithm 400 remains in block 405. Ideally, when the specific EAPOL messages arrive, an interrupt is asserted and the wireless communications device can proceed. Alternatively, the wireless communications device can periodically test for the arrival of the messages. When the wireless communications device receives the specific EAPOL messages, it starts a scan for other wireless access points (block 410).

If the wireless communications device finds other wireless access points, it will send out context lease requests to its current wireless access point. The current wireless access point then will forward the context lease requests to the other wireless access points. The use of the trusted network entity (the current wireless access point) may simply the forthcoming authentication step. The wireless communications device then waits for the responses to the context least requests (block 420). However, rather than sitting idle, the wireless communications device can return to doing what it was doing prior to receiving the specific EAPOL messages.

Once the wireless communications device receives the responses to the context lease requests, it will select the best candidate wireless access point from a set of wireless access points that returned an affirmative to its request (block 425). The selection may simply be selecting the wireless access point with the strongest signal level, or it may select the wireless access point with the smallest number of other communications device attached to it. With the wireless access point selected, the wireless communications device sends a disassociate message to the current wireless access point, terminating its communications link with that wireless access point (block 430). This is immediately followed by its transmission of a reassociate message to the selected wireless access point (block 435). Because the authentication has already been completed, the communications link between the wireless communications device and the selected wireless access point is quickly established. Although the current iteration of the algorithm 400 is now complete, the algorithm 400 is once again restarted, to wait for the arrival of additional specific EAPOL messages.

Figure 5:
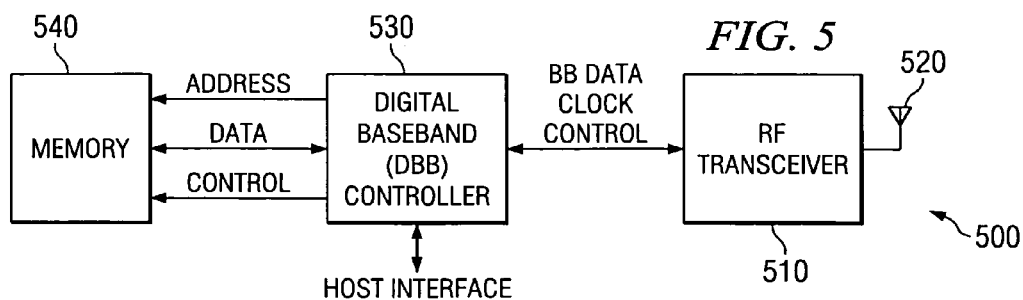
FIG. 5 illustrates a block diagram of a wireless communications device with support for a fast handoff procedure according to a preferred embodiment of the present invention.

Referring now to FIG. 5, the block diagram illustrates a wireless communications device 500 with enhanced fast handoff according to a preferred embodiment of the present invention. As discussed previously, the enhanced fast handoff is operable at any radio frequency and with any type of wireless communications network that permits its wireless communications devices to roam among a set of wireless access point.

The enhanced fast handoff is implemented in an RF transceiver 510 that is coupled to an antenna 520. The antenna 520 is responsible for receiving analog RF signals transmitted over-the-air. Additionally, the antenna 520 may be used to transmit analog RF signals originating from the wireless device 500. The RF transceiver 510 is responsible for taking the analog RF signals received by the antenna 520 and converting it into a digital data stream that is usable by the remainder of the wireless device 500. Since the RF transceiver 510 can transmit signals as well as receive them, the RF transceiver 510 is also responsible for converting a digital data stream into an analog signal suitable for transmission.

After the RF transceiver 510 receives and then converts the analog RF signal into a digital data stream by an analog-to-digital converter (ADC) or a quantizer (neither shown) followed by filtering and other post processing, the digital data stream is transferred to a digital baseband (DBB) controller 530. The DBB controller 530 is responsible for taking the digital data stream and performing any necessary digital signal processing on it to convert the digital data stream in to a stream of user usable data. Examples of the processing performed by the DBB controller 530 may include, but is not limited to: digital filtering, data encoding and decoding, error detection and correction, and communications protocol software stack and applications. The DBB controller 530 is coupled to a memory 540 that may contain a read-only memory (ROM), a random access memory (RAM), flash programmable memory, etc. (none are shown). The memory 540 can be used to store necessary subroutines used in the DBB controller 540, configuration data, scratch memory, etc.

The DBB controller 530 may be coupled to some other digital device via a host interface. The host interface may be a proprietary interface or it may be adherent to an interconnection standard such as: RS-232, universal serial bus, Firewire, IEEE 802.11, PCcard, etc. The host interface allows the connection of a digital device to the wireless device 500 via the DBB controller 530. Examples of digital devices include computers, multi-media devices, Internet appliances, storage devices, etc.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A fast handoff method comprising:
   receiving an authentication message at a communication device from a current wireless access point (WAP); in responce to the authentication message scanning for an alternate WAP;
   if the alternate WAP was found:
      sending a message to the current WAP;
      receiving a response message from the current WAP;
      if the response message is an affirmative:
         disassociating with the current WAP; and
         reassociating with the alternate WAP.

2. The method of claim 1, wherein the scanning step comprises:
   searching for an identifier message from the alternate WAP; and
   sending a probe request message using the authentication message to the alternate WAP after finding the identifier message.

3. The method of claim 2, wherein the searching step may find more than one alternate WAP, and a probe request message is sent to each alternate WAP found.

4. The method of claim 2 further comprising the step of receiving an acknowledgment message for the probe request message.

5. The method of claim 1, the sending step comprises sending a message with an address of the alternate WAP to the current WAP.

6. The method of claim 5, wherein the message further contains a duration of a context block lease.

7. The method of claim 1 further comprising the step of returning to normal operating mode after the sending step.

8. The method of claim 1, wherein a plurality of alternate WAPs were found and a plurality of response messages were received from the current WAP, and the method further comprises the step of selecting a preferred alternate WAP from the plurality of alternate WAPs.

9. The method of claim 1, wherein each response message from the current WAP contains a response from a different alternate WAP, and the preferred alternate WAP is selected from a set of alternate WAPs responding affirmatively.

10. The method of claim 9, wherein the preferred alternate WAP had a strongest signal level.

11. The method of claim 9, wherein the preferred alternate WAP had a minimum number of wireless communications devices already associated with it.

12. The method of claim 1 further comprising the step of notifying a distributed system after the disassociating step.

13. The method of claim 1, wherein the disassociating step comprises the step of transmitting a disassociate message to the current WAP.

14. The method of claim 1 further comprising the step of notifying a distributed system after the reassociating step.

15. The method of claim 1, wherein the reassociating step comprises the step of transmitting a reassociate message to the alternate WAP.

16. The method of claim 1, wherein there is a plurality of alternate WAPs and one selected alternate WAP, and the reassociating step comprises the step of transmitting a reassociate message to the selected alternate WAP.

17. The method of claim 1 further comprising the step of continuing to scan for the alternate WAP if the first scanning step fails.

18. A method for reducing authentication latency comprising:
   at a first wireless access point (WAP):
      transmitting an authentication message to a wireless communications device (WCD);
      forwarding a context lease request to an alternate WAP;
      returning a context lease response to the WCD;
   at the WCD:
      receiving an authentication message;
      scanning for an alternate wireless access point (WAP);
      if the alternate WAP was found:
         sending a message to a current WAP;
         receiving a response message from the current WAP;
         if the response message is an affirmative:
            disassociating with the current WAP;
            reassociating with the alternate WAP;
   at the alternate WAP:
      receiving the context lease request from the first WAP;
      authenticating the WCD;

returning an affirmative response message if authentication succeeds, else return a negative response message; and reassociating with the WCD if authentication succeeds.

19. The method of claim 18, wherein the forwarding step comprises:

receiving the context lease request from the WOD; and transmitting the context lease request to the alternate WAP.

20. The method of claim 18, wherein the first returning step comprises:

receiving the context lease response from the alternate WAP; and transmitting the context lease response to the WCD.

21. The method of claim 18, wherein the authenticating step comprises the step of using information in the context lease request to verify the authenticity of the WCD.

22. The method of claim 21, wherein the contents of the response message is dependent upon the success of the authenticating step.

23. The method of claim 18 further comprising the step at the WCD of continuing to scan for the alternate WAP if the scanning step fails.

24. The method of claim 18, wherein while the alternate WAP is authenticating the WCD, the WCD is continuing normal operations.

* * * * *